United States Patent
Connell, II et al.

(10) Patent No.: US 10,740,572 B2
(45) Date of Patent: Aug. 11, 2020

(54) USING ROBOT PLANS AS PARALLEL LINGUISTIC CORPORA

(71) Applicant: International Business Machines Corporation, Armonk, NY (US)

(72) Inventors: Jonathan H. Connell, II, Cortlandt-Manor, NY (US); Jae-Eun Park, Wappingers Falls, NY (US); Nalini K. Ratha, Yorktown Heights, NY (US); Emrah Akin Sisbot, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 15/969,400

(22) Filed: May 2, 2018

(65) Prior Publication Data
US 2019/0340249 A1  Nov. 7, 2019

(51) Int. Cl.
*G06F 40/47* (2020.01)
*G10L 15/22* (2006.01)
*G10L 15/06* (2013.01)
*B25J 9/16* (2006.01)

(52) U.S. Cl.
CPC .............. *G06F 40/47* (2020.01); *B25J 9/161* (2013.01); *B25J 9/163* (2013.01); *G10L 15/063* (2013.01); *G10L 15/22* (2013.01); *G10L 2015/223* (2013.01); *Y10S 901/09* (2013.01); *Y10S 901/46* (2013.01)

(58) Field of Classification Search
None
See application file for complete search history.

(56) References Cited

U.S. PATENT DOCUMENTS

| 7,475,390 | B2 | 1/2009 | Berstis et al. |
| 7,493,559 | B1 | 2/2009 | Wolff et al. |
| 8,122,424 | B2 | 2/2012 | Berstis et al. |
| 2005/0005266 | A1* | 1/2005 | Datig ............... G06F 17/279 717/136 |
| 2005/0065652 | A1* | 3/2005 | Sakagami ........... B25J 9/1694 700/245 |
| 2005/0273317 | A1* | 12/2005 | Brill ................ G06F 17/274 704/9 |
| 2008/0262826 | A1 | 10/2008 | Pacull |
| 2009/0299729 | A1 | 12/2009 | Quirk et al. |
| 2013/0103390 | A1 | 4/2013 | Fujita et al. |
| 2015/0248401 | A1 | 9/2015 | Ruvini et al. |

* cited by examiner

*Primary Examiner* — Antim G Shah
(74) *Attorney, Agent, or Firm* — Diana R. Gerhardt; Jack V. Musgrove (57) ABSTRACT

Parallel linguistic corpora used to train cognitive translation systems are built from robot plans. A collection of robot plans in various languages is analyzed in candidate pairings to see if any two plans are directed to the same task. If so, verbal instructions in different languages from the two plans (such as plan names) are assumed to have the same meaning, and are stored in association as part of the bilingual corpus. If each plan has multiple steps, the corresponding steps from the two plans can also be stored in association as part of the corpus. Robot plans are modeled as finite state automata having a plurality of links representing sensory states and a plurality of nodes representing motor actions, and the determination of plan similarity is based on a comparison of the two FSAs.

17 Claims, 4 Drawing Sheets

USING ROBOT PLANS AS PARALLEL LINGUISTIC CORPORA

BACKGROUND OF THE INVENTION

Field of the Invention

The present invention generally relates to language translation systems, and more particularly to a method of providing more comprehensive parallel linguistic corpora for such systems.

Description of the Related Art

Modern language translation systems rely on a variety of technologies to enable quick and accurate translation of phrases and sentences. Among these technologies are natural language processing and cognitive analysis. Natural language processing (NLP) is a field of computer science, artificial intelligence, and linguistics concerned with the interactions between computers and human (natural) languages, not limited to English. Many challenges in NLP involve natural language understanding, that is, enabling computers to derive meaning from human or natural language input, and others involve natural language generation allowing computers to respond in a manner familiar to a user. For example, a non-technical person may input a natural language question to a computer system, and the system intelligence can provide a natural language answer which the user can hopefully understand. NLP uses text analysis such as a text annotator that searches text documents (corpora) and analyzes them relative to a defined set of tags. The text annotator can generate linguistic annotations within the document to tag concepts and entities that might be buried in the text. NLP can also involve relationship extraction, i.e., detecting semantic relations within a set of artifacts. Examples of advanced computer systems that use natural language processing include virtual assistants, Internet search engines, and deep question answering systems.

A cognitive system (sometimes referred to as deep learning, deep thought, or deep question answering) is a form of artificial intelligence that uses machine learning and problem solving. Cognitive systems often employ neural networks although alternative designs exist. A modern implementation of artificial intelligence is the IBM Watson™ cognitive technology, which applies advanced natural language processing, information retrieval, knowledge representation, automated reasoning, and machine learning technologies to the field of open domain question answering. Such cognitive systems can rely on existing corpora and analyze them in various ways in order to extract answers relevant to a query, such as person, location, organization, and particular objects, or identify positive and negative sentiment. Different techniques can be used to analyze natural language, identify sources, find and generate hypotheses, find and score evidence, and merge and rank hypotheses. Models for scoring and ranking the answer can be trained on the basis of large sets of question (input) and answer (output) pairs. The more algorithms that find the same answer independently, the more likely that answer is correct, resulting in an overall score or confidence level.

Machine language translation systems typically implement phrased-based translations that have limited sensitivity to morphological, syntactical and/or semantic differences between the source and target languages. The process of customizing (i.e., training) a phrased-based statistical machine translation system commonly uses parallel (bilingual) corpora—the exact same material written in two different languages—to prioritize the statistical hits of correct translations. There exist large corpora linking multiple languages, for example, the twenty-one languages in which the European Parliament proceedings are recorded, the six language set (English-French-Spanish-Russian-Chinese-Arabic) of United Nations resolutions, and various government proceedings such as Canadian which are recorded in both English and French. The Christian bible is also very useful as it was, until recently, the most widely translated book, particularly in many obscure languages.

SUMMARY OF THE INVENTION

The present invention in at least one embodiment is generally directed to a method of building a parallel linguistic corpus for a translation system by receiving robot plans which contain verbal instructions in different languages relating to control of kinematic robots, identifying a first one of the robot plans that includes a first verbal instruction in a first language, identifying a second one of the robot plans that includes a second verbal instruction in a second language different from the first language, determining that the first robot plan and the second robot plan are directed to a substantially identical task, and responsively storing the first verbal instruction in association with the second verbal instruction as part of the parallel linguistic corpus. For example, the first verbal instruction can be a first plan name for the first robot plan and the second verbal instruction can be a second plan name for the second robot plan. The plans can have steps such that the first robot plan includes a first series of steps having first step names and the second robot plan includes a second series of steps having second step names, in which case the first step names can be stored in respective association with the second step names as part of the parallel linguistic corpus. If the first robot plan has a missing step as compared to the second robot plan, a request can be issued to a linguistic expert to provide an additional step name in the first language for the missing step. The robot plans can be modeled as finite state automata having a plurality of links representing sensory states and a plurality of nodes representing motor actions. The determination of plan similarity would thus be based on a comparison of a first finite state automata of the first robot plan to a second finite state automata of the second robot plan. Plans can be considered as directed to a similar task when they each include substantially the same actions in substantially the same order. A parallel linguistic corpus so built can be applied by using it to train a cognitive translation system, so the cognitive translation system can translate a request from the first language into the second language.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

Modern high-quality language translation systems rely on parallel corpora for training. For some language pairs, such as English-French, this is easy to arrange since there are so many sources of parallel corpora. However, for other language pairs (especially in developing or third-world nations) there are no such parallel documents, or there are very few. This is especially true if the countries where the native speakers reside are far apart geographically. For instance, there is very little parallel material between Quechua (Peru) and Swahili (Tanzania) or Vietnamese. Moreover, there is some difficulty in aligning the words within existing corpora due to head-modifier order, complex case structure, gender, honorifics, ergativity, irregular verbs, and idioms.

It would, therefore, be desirable to devise an improved method of supplying parallel linguistic corpora for translation systems. It would be further advantageous if the method could be easily applied to a wider range of available languages to acquire multifaceted corpora. The present invention in its various embodiments achieves these and other advantages by using plans for kinematic robots to generate bilingual reference sources. If robots have been trained in similar tasks in two different languages, then the verbal instructions associated with these tasks can form the needed parallel corpus. If two plans are keyed off linguistic phrases that are in different languages but are equivalent then recognizing that the plans are substantially the same suggests that these two phrases are parallel. Moreover, if a particular procedure is broken down into multiple steps then these steps (or sub-steps) can also be put into correspondence to enlarge the size of the parallel corpus. This approach enables machine translation between two languages even if there are no governmental or cultural documents which are written in both languages.

Figure 1:
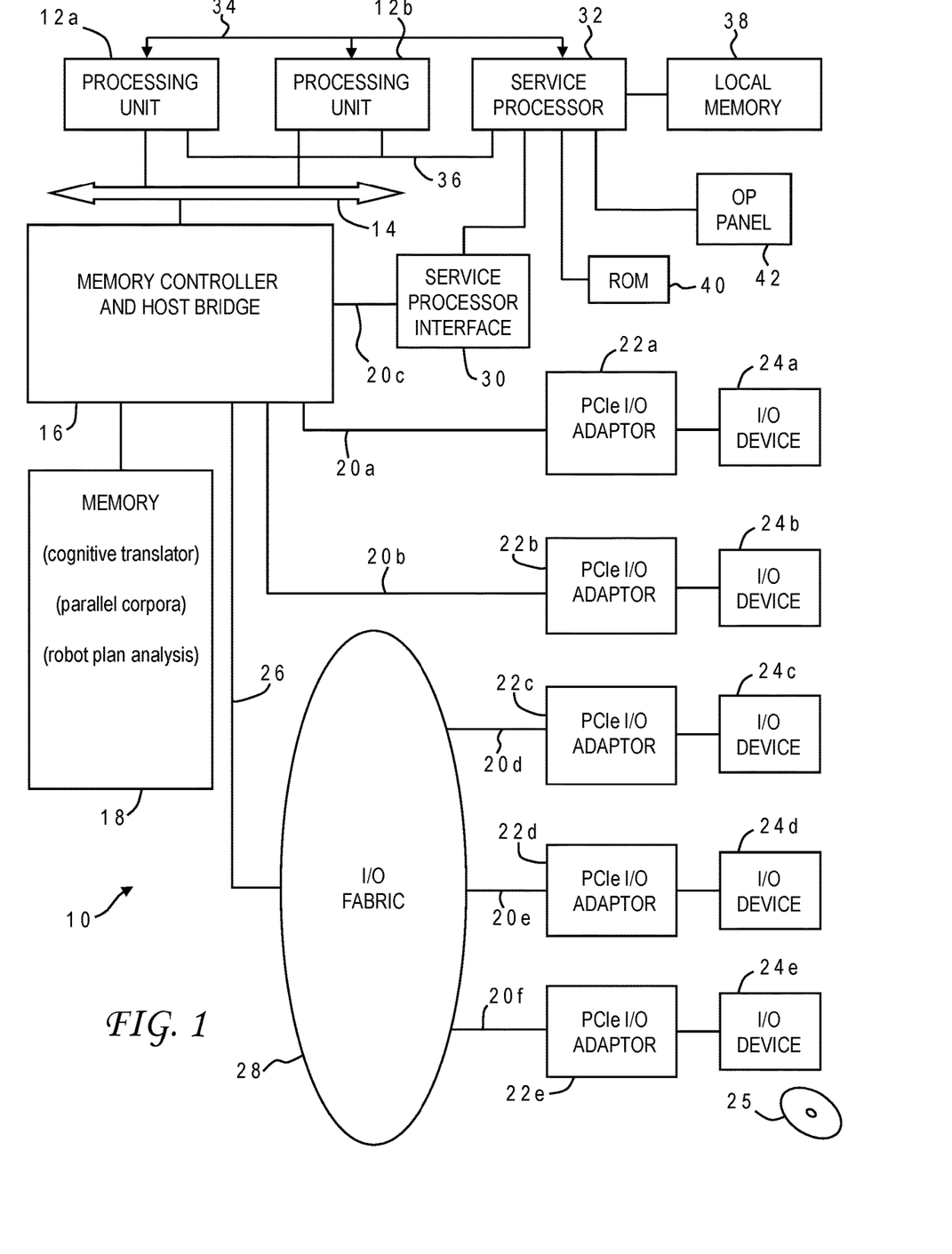
FIG. 1 is a block diagram of a computer system programmed to carry out bilingual corpus generation and/or language translation in accordance with one implementation of the present invention.

With reference now to the figures, and in particular with reference to FIG. 1, there is depicted one embodiment 10 of a computer system in which the present invention may be implemented to carry out bilingual corpus generation and/or language translation. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications in accordance with the present invention such as a robot plan analysis program and a cognitive system used for translation services which relies on parallel linguistic corpora.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the parallel linguistic corpus generation program of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a process that uses novel analysis techniques to build parallel linguistic corpora which can in turn be used by cognitive translation services. Accordingly, a program embodying the invention may additionally include conventional aspects of various cognitive system tools, and these details will become apparent to those skilled in the art upon reference to this disclosure.

Figure 2:
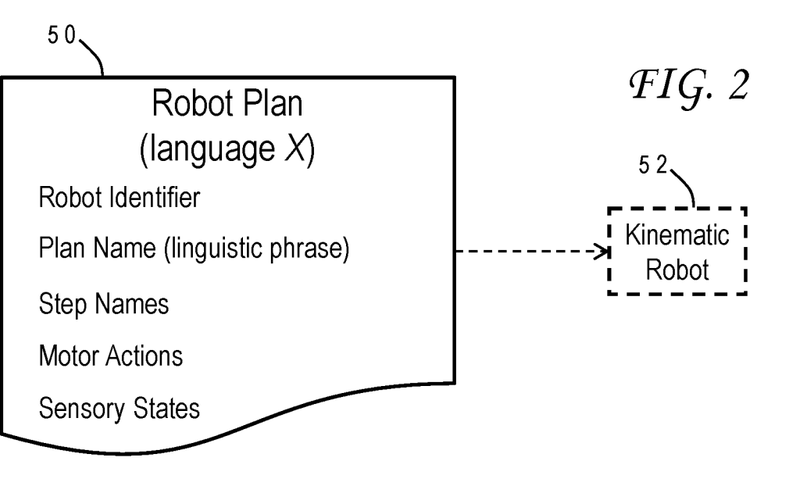
FIG. 2 is a pictorial representation of a robot plan which contains verbal instructions for controlling kinematic robots in accordance with one implementation of the present invention.

Referring now to FIG. 2, there is depicted an exemplary robot plan 50 which may be used in combination with other robot plans to generate parallel linguistic corpora in accordance with the present invention. Robot plan 50 is provided as an electronic document such that it is computer-readable or can easily be converted to a computer-readable format. The electronic document may be generated in various manners, such as acquired directly from a robot manufacturer, built from paper instructions (hard copy) using optical recognition, or manually input. Robot plan 50 is designed to control a kinematic robot 52, i.e., a robot whose functions include physical movement of one or more parts.

Robot plan 50 is provided in any particular language X and can include a variety of information. At the minimum, robot plan 50 includes some verbal instruction which can be used to identify the particular task or type of task that is to be carried out. The task information can be a plan name or other linguistic phrase. For example, for a recreational robot a task might be "Kick the ball". This plan name is provided in the particular language X of this plan. Accordingly, when two plans are keyed off linguistic phrases in different languages and it can be recognized that the plans are the substantially identical (e.g., substantially the same actions in substantially the same order), then these two phrases can be considered parallel. The two tasks from a candidate pair of plans need not be exactly the same to invoke association. Substantially identical tasks can also qualify for correspondence of instructions. The question of how similar the tasks must be is resolved by the system designer, e.g., as long as it is discernable that some fraction of the steps involved in the task are the equivalent.

In this implementation robot plan 50 has additional information including, but not limited to, a robot identifier, time-ordered steps for at least one procedure with corresponding step names, motor actions of kinematic robot 52, and sensory states of kinematic robot 52. The identifying information may for example include a numeric value (robot ID number), or a robot name. This identifier may be explicit within the robot plan electronic document or may be inferred from a file name of the document. The robot identifier can help buttress the conclusion that two plans are directed to the same task. i.e., when they are applied to the same robot. Step names can be provided when a procedure is broken down into pieces. These steps (or sub-steps) can also be put into fine-grained correspondence to enlarge the size of the parallel corpus.

Figure 3:
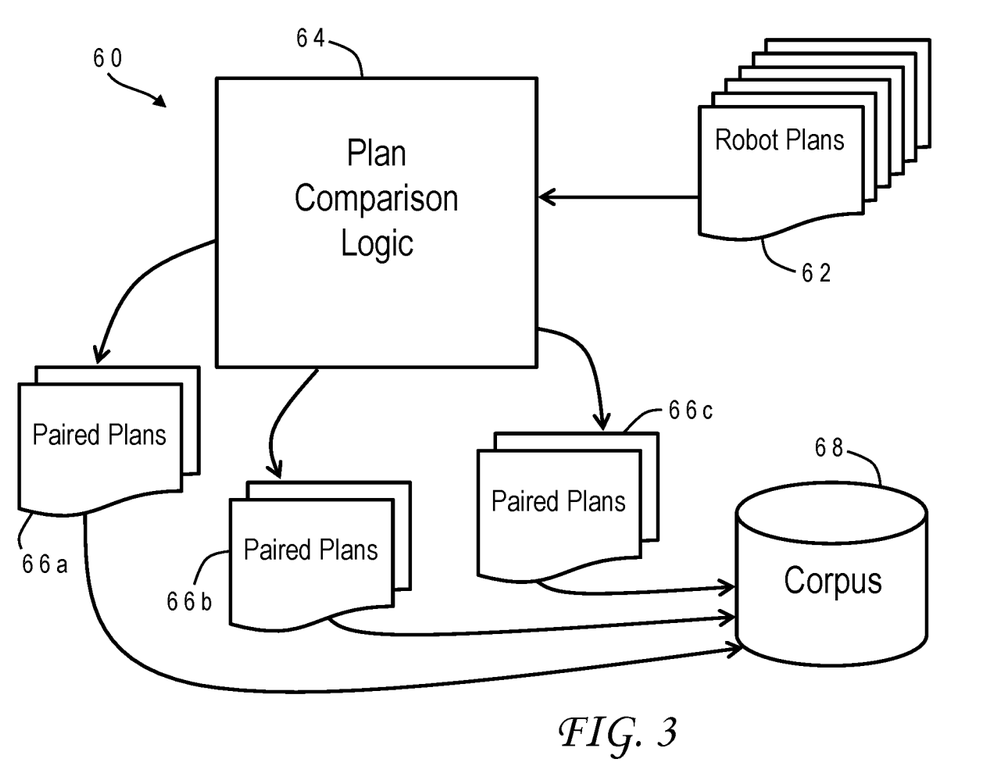
FIG. 3 is a high-level block diagram of a corpus generation system which takes in a large number of robot plans in various languages and finds a pair of corresponding plans in two different languages to build parallel linguistic corpora in accordance with one implementation of the present invention.

FIG. 3 shows a corpus generation system 60 which receives as an input a collection 62 of different robot plans in various languages. The robot plans forming collection 62 may be obtained in any convenient manner, such as manual curation, but may also be gleaned from other sources such as directly from robot manufacturers or by scouring different web sites on the Internet (webcrawling) using cognitive techniques to identify potential robot plans. Identification of robot plan web sites and parsing their content may become easier with the arrival of "Web 3.0" technology which uses, among other things, a semantic markup (nomenclature) model.

The robot plans are fed to plan comparison logic 64 which may reside in a computer such as computer system 10. Plan comparison logic 64 may be algorithmic in nature, or may be embodied in a separate cognitive system programmed to carry out natural language programming in multiple languages, i.e., the cognitive system can generate a confidence score regarding the semantic similarity different plans and if the score exceeds a predetermined threshold then the two plans are considered sufficiently similar to warrant pairing. Similarity can also be based on fixed rules. The results are multiple pairs 66a, 66b, 66c of robot plans, each pair comprising robot plans in two different languages. Plan pairs for the same language pair (e.g., Quechua and Swahili) are stored in a single parallel corpus 68 for later use by the cognitive translation system.

Figure 4:
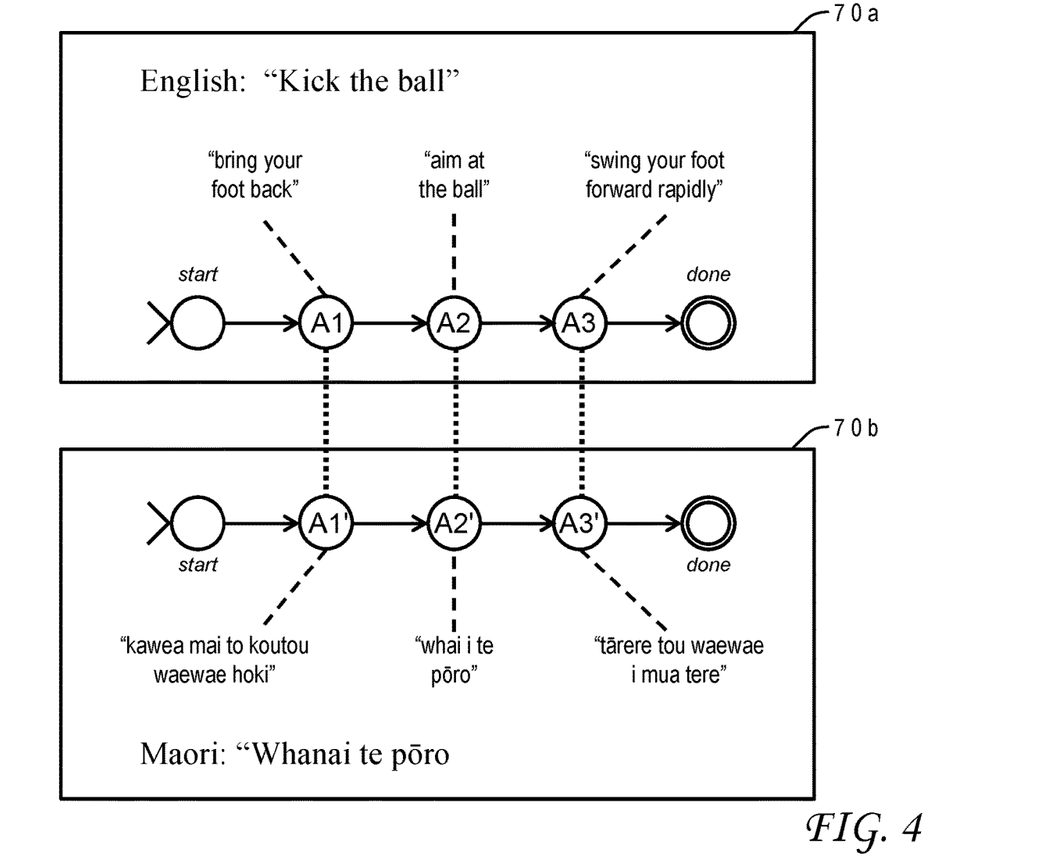
FIG. 4 is a graphical representation of two different robot plans modeled as finite state automata in accordance with one implementation of the present invention.

In one implementation, plans are represented as finite state automata (FSA) with links representing sensory states and nodes representing motor actions. If the hardware of two systems is similar, then the representation of the sensory states and motor actions will be comparable, irrespective of the language used to create the plan. This allows two FSAs to be put into correspondence in a node-to-node and link-to-link fashion. If source language annotations have been associated with each node and each link, these can be considered to have the same semantic import. Thus the associated phrases in the different teaching languages can be used to form a parallel corpus between the two languages.

As seen in the example of FIG. 4, a robot has been taught to kick a ball in two different languages—one in English and one in Maori. The plan name for the English-based plan is "Kick the ball" while the plan name for the Maori-based plan is "Whana i te pōro". In the FSA model 70a for the English-based plan, there are three ordered steps A1, A2, A3 for the ball kicking routine, with corresponding step descriptors "bring your foot back", "aim at the ball", and "swing your foot forward rapidly". The FSA model 70b for the Maori-based plan similarly has three ordered steps A1', A2', and A3' with corresponding step descriptors "kawea mai to koutou waewae hoki", "whai i te pōro", and "tāxere tou waewae i mua tere". Because the two routines consists of exactly the same physical robot actions (A1=A1', A2=A2', and A3=A3') in the same order, the system can conclude that the English phrase "Kick the ball" and the Maori phrase "Whana i te pōro" have the same meaning, so these two phrases are stored in association in the parallel linguistic corpus.

The idea is that users will teach the robot (from scratch) to do things in whatever native language they use. This instruction will generally consist of a verb-like object and associated noun-like objects (which are typically taught independently, e.g., by pointing). After teaching, the phrase in their native language is "grounded" in a particular set of robot actions. Because the invention assumes that the robots are identical everywhere in the world (e.g., Sears model T3201) then the actions are independent of language. That is, the same sequence of machine codes (e.g., "fcn-134→fcn-933→fcn-005→fcn-784") is produced no matter where in the world the robot is. This sequence forms the key for matching parts of one language to parts of another language. So, for example, the Maori robot knows the "meaning" of the language phrase in terms of what actions to perform.

While there may be n primitive actions, there may be as many as $n^4$ four-step procedures. Therefore matching sequences is more powerful than just matching individual primitives.

The present invention recognizes that in some cases near identical plans might not have the exact same number of steps, i.e., one plan could still have extra actions. So a (n+1) step procedure in one language (L1) may have a near match with an n step procedure in another language (L2). In this case, the plan comparison logic 64 could issue a request to a teacher of language L2 (or other subject matter expert) for a description of the missing step in the overall procedure. At that point, it can update the language correspondence corpus.

Figure 5:
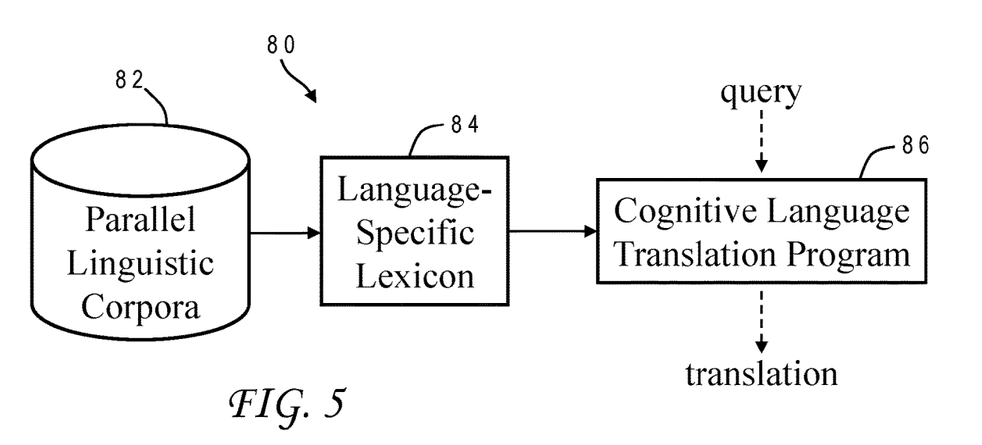
FIG. 5 is a high-level block diagram of a cognitive language translation system which relies on parallel linguistic corpora in accordance with one implementation of the present invention.

Once parallel linguistic corpora have been so aggregated, they can be applied as depicted in FIG. 5. A cognitive translation system 80 includes the parallel linguistic corpora 82 which may be constructed as explained above as well as using additional conventional methods for a more comprehensive foundation. The corpora 82 are used to build a language-specific lexicon 84 for each language supported by the system. A cognitive language translation program 86 then receives a translation request or query in the first language from a user for conversion to the second language, and utilizes the language-specific lexicon 84 to generate a translation response or answer.

For example, an English-speaking doctor may have asked a Maori person "What hurts" (translated to Maori). The Maori person responds "waewae" which is a term unknown to the doctor, and so is input as the query to the translation program. From the phrase associated with nodes A1=A1' in FIG. 4 it is known that the equivalent function is generically "retract <appendage>" (in robot-ese) which through partial English parsing is "bring-back <foot>" and in Maori is "kawea <waewae>". This association provides the system with the translation pair "waewae ↔ foot" which allows it to reply to the doctor in English.

Figure 6:
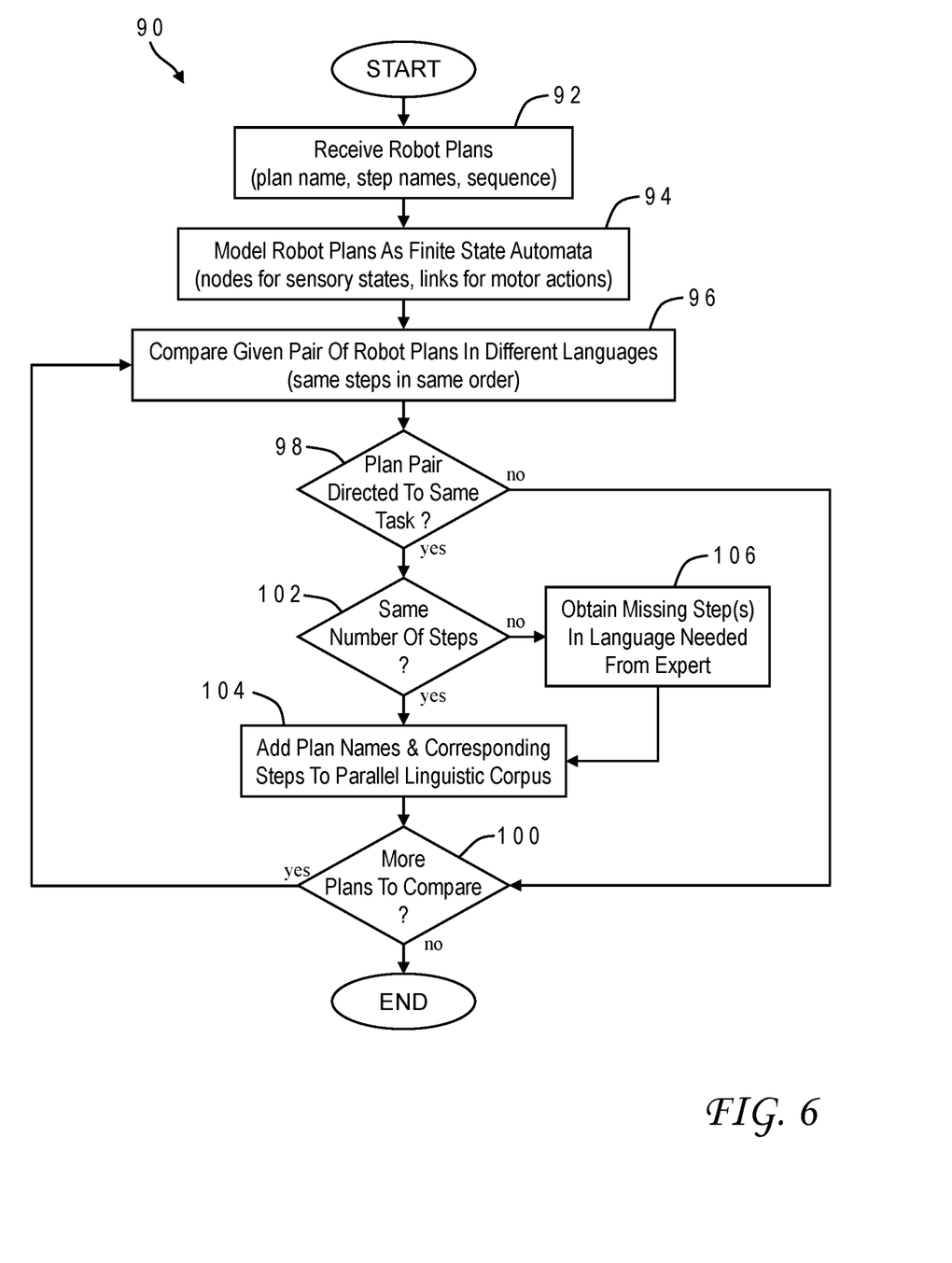
FIG. 6 is a chart illustrating the logical flow for a corpus building process in accordance with one implementation of the present invention.

The present invention may be further understood with reference to the chart of FIG. 6 which illustrates the logical flow for a corpus building process 90 in accordance with one implementation of the present invention. Process 90 begins when the computer system receives the robot plans 92. Each robot plan is then modeled as a finite state automata 94. These FSAs models are compared to determine which pairs of robot plans (in different languages) are sufficient similar to warrant correspondence 96. The primary determinant is whether the two plans are considered directed to the same general task 98. If not, the process asks whether more robot pairs still need to be analyzed 100, and returns iteratively to box 96 to compare the next pair. If the tasks of the two plans are considered the same, the plans can be further examined to see if they have the same number of steps 102. If so, the plan names of the two plans are added in association to the corpus, and the corresponding step names are also added in respective association 104. If a step is missing from one of the plans, the system obtains a description of the missing step(s) as needed 106, and then stores the phrases at 104. The process again repeats iteratively for any remaining pairs needing analysis, until all potential pairings are considered and the process ends.

The present invention thereby offers a significant improvement in the technical field of cognitive translation. In the future as more domestic and industrial robots are deployed to an ever-wider variety of areas and taught procedures in native languages, the invention will build increasingly more sophisticated linguistic corpora. This leveraging of data is easily exploited as an interlingua which helps relate two languages. The approach of the present invention enables machine translation between two languages even if there are no governmental or other documents which are written in both languages. Moreover, the sub-steps of a plan provide a natural fine-grained alignment of the two sets of linguistic terms.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the invention has been described in the context of a recreational robot, it is of course useful with industrial robots. The invention could theoretically be expanded beyond kinematic robots to purely software bots as well, provided those bots have plans which can be similarly analyzed. It is therefore contemplated that such modifications can be made without departing from the spirit or scope of the present invention as defined in the appended claims.

What is claimed is:

1. A method of building a parallel linguistic corpus for a translation system comprising:
  receiving a plurality of robot plans which contain verbal instructions in different languages relating to control of kinematic robots, by executing first program instructions in a computer system;
  identifying a first one of the robot plans that includes a first verbal instruction in a first language, by executing second program instructions in the computer system, the first robot plan including a first series of steps having first step names;
  identifying a second one of the robot plans that includes a second verbal instruction in a second language different from the first language, by executing third program instructions in the computer system, the second robot plan including a second series of steps having second step names;
  determining that the first robot plan and the second robot plan are directed to a substantially identical task, by executing fourth program instructions in the computer system;
  responsive to said determining, storing the first verbal instruction in association with the second verbal instruction as part of the parallel linguistic corpus wherein the first step names are stored in respective association with the second step names as part of the parallel linguistic corpus, by executing fifth program instructions in the computer system.

2. The method of claim 1 wherein the first verbal instruction is a first plan name for the first robot plan and the second verbal instruction is a second plan name for the second robot plan.

3. The method of claim 1 wherein the first robot plan has at least one missing step as compared to the second robot plan, and further comprising issuing a request to a linguistic expert to provide an additional step name in the first language for the missing step.

4. The method of claim 1 further comprising modeling each robot plan as a finite state automata having a plurality of links representing sensory states and a plurality of nodes representing motor actions, wherein said determining includes comparing a first finite state automata of the first robot plan to a second finite state automata of the second robot plan.

5. The method of claim 1 wherein the first and second robot plans are determined to be directed to a similar task by establishing that the first and second robot plans each include substantially same actions in a substantially same order.

6. The method of claim 1 further comprising:
training a cognitive translation system with the parallel linguistic corpus;
receiving a translation request in the first language at the cognitive translation system; and
using the cognitive translation system to provide a translation response in the second language to the translation request.

7. A computer system comprising:
one or more processors which process program instructions;
a memory device connected to said one or more processors; and
program instructions residing in said memory device for building a parallel linguistic corpus for a translation system by receiving a plurality of robot plans which contain verbal instructions in different languages relating to control of kinematic robots, identifying a first one of the robot plans that includes a first verbal instruction in a first language wherein the first robot plan includes a first series of steps having first step names, identifying a second one of the robot plans that includes a second verbal instruction in a second language different from the first language wherein the second robot plan includes a second series of steps having second step names, determining that the first robot plan and the second robot plan are directed to a substantially identical task, responsive to said determining, storing the first verbal instruction in association with the second verbal instruction as part of the parallel linguistic corpus wherein the first step names are stored in respective association with the second step names as part of the parallel linguistic corpus.

8. The computer system of claim 7 wherein the first verbal instruction is a first plan name for the first robot plan and the second verbal instruction is a second plan name for the second robot plan.

9. The computer system of claim 7 wherein the first robot plan has at least one missing step as compared to the second robot plan, and further comprising issuing a request to a linguistic expert to provide an additional step name in the first language for the missing step.

10. The computer system of claim 7 wherein said program instructions further model each robot plan as a finite state automata having a plurality of links representing sensory states and a plurality of nodes representing motor actions, and the determining includes comparing a first finite state automata of the first robot plan to a second finite state automata of the second robot plan.

11. The computer system of claim 7 wherein the first and second robot plans are determined to be directed to a similar task by establishing that the first and second robot plans each include substantially same actions in a substantially same order.

12. The computer system of claim 7 wherein said program instructions further train a cognitive translation system with the parallel linguistic corpus, receive a translation request in the first language at the cognitive translation system, and provide a translation response in the second language to the translation request using the cognitive translation system.

13. A computer program product comprising:
a computer readable storage medium; and
program instructions residing in said storage medium for building a parallel linguistic corpus for a translation system by receiving a plurality of robot plans which contain verbal instructions in different languages relating to control of kinematic robots, identifying a first one of the robot plans that includes a first verbal instruction in a first language wherein the first robot plan includes a first series of steps having first step names, identifying a second one of the robot plans that includes a second verbal instruction in a second language different from the first language wherein the second robot plan includes a second series of steps having second step names, determining that the first robot plan and the second robot plan are directed to a substantially identical task, responsive to said determining, storing the first verbal instruction in association with the second verbal instruction as part of the parallel linguistic corpus wherein the first step names are stored in respective association with the second step names as part of the parallel linguistic corpus.

14. The computer program product of claim 13 wherein the first verbal instruction is a first plan name for the first robot plan and the second verbal instruction is a second plan name for the second robot plan.

15. The computer program product of claim 13 wherein the first robot plan has at least one missing step as compared to the second robot plan, and further comprising issuing a request to a linguistic expert to provide an additional step name in the first language for the missing step.

16. The computer program product of claim 13 wherein said program instructions further model each robot plan as a finite state automata having a plurality of links representing sensory states and a plurality of nodes representing motor actions, and the determining includes comparing a first finite state automata of the first robot plan to a second finite state automata of the second robot plan.

17. The computer program product of claim 13 wherein the first and second robot plans are determined to be directed to a similar task by establishing that the first and second robot plans each include substantially same actions in a substantially same order.

* * * * *